US006675147B1

(12) United States Patent
Woestemeyer et al.

(10) Patent No.: US 6,675,147 B1
(45) Date of Patent: Jan. 6, 2004

(54) INPUT METHOD FOR A DRIVER INFORMATION SYSTEM

(75) Inventors: Stefan Woestemeyer, Hildesheim (DE); Ulrich Gaertner, Nordstemmen (DE); Christopher Pflug, Hildesheim (DE); Martin Kossira, Marbach Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/538,011

(22) Filed: Mar. 29, 2000

(30) Foreign Application Priority Data

Mar. 31, 1999 (DE) .......................................... 199 14 631

(51) Int. Cl.[7] .............................................. G10L 21/00
(52) U.S. Cl. ...................... 704/275; 704/270; 704/231; 704/251; 701/221; 379/88.03
(58) Field of Search ...................... 704/200, 270–275, 704/231, 251, 9; 701/221; 379/88.03

(56) References Cited

U.S. PATENT DOCUMENTS

| 4,502,123 | A |   | 2/1985 | Minami et al. |       |
|-----------|---|---|--------|---------------|-------|
| 4,677,429 | A |   | 6/1987 | Glotzbach     |       |
| 4,758,959 | A | * | 7/1988 | Thoone et al. | 701/221 |
| 5,231,691 | A | * | 7/1993 | Yasuda        | 704/200 |
| 5,299,125 | A | * | 3/1994 | Baker et al.  | 704/9   |
| 5,809,469 | A | * | 9/1998 | Goldstein et al. | 704/270 |
| 5,874,939 | A |   | 2/1999 | Galvin        |       |
| 5,912,949 | A | * | 6/1999 | Chan et al.   | 379/88.03 |
| 5,924,803 | A | * | 7/1999 | Curtin et al. | 400/100 |

FOREIGN PATENT DOCUMENTS

| DE | 195 19 066 A1 | 5/1996 |
| DE | 195 19 066    | 6/1996 |
| DE | 197 04 916 A1 | 10/1997 |
| DE | 197 04 916    | 10/1997 |
| DE | 197 17 601    | 10/1997 |
| DE | 197 17 601 A1 | 10/1997 |
| DE | 694 13 322 T2 | 2/1999 |
| EP | 0 633 452 A   | 1/1995 |

OTHER PUBLICATIONS

Patent Abstracts of Japan vol. 1998, No. 08, Jun. 30, 1998, Mar. 6, 1998.

Carlson S et al: "Application of Speech Recognition Technology to its Advanced Traveler Information Systems", Pacific Rim Transtech Conference. Vehicle Navigation and Information Systems Conference Proceedings. Washington, Jul. 30–Aug. 2, 1995, New York, IEEE, US BD.Conf. 6, Jul. 30, 1995, pp. 118–125.

* cited by examiner

Primary Examiner—Vijay Chawan
(74) Attorney, Agent, or Firm—Michael J. Striker

(57) ABSTRACT

A method for input of a sequence of letters and/or numbers in a driver information system provides for input of individual symbols of the sequence of letters and/or numbers either by input of speech information or pressing a key. Especially it is possible to switch between input by means of the key or speech during input of a single sequence.

10 Claims, 6 Drawing Sheets

INPUT METHOD FOR A DRIVER INFORMATION SYSTEM

BACKGROUND OF THE INVENTION

1. Field of the Invention

The present invention relates to a method for input of a sequence of letters and/or numbers in a driver information system, in which the input of the sequence of letters and/or numbers occurs by a key or keys or by a device for speech input. In this type of method the letters and/or numbers are input one after the other.

2. Prior Art

Driver information systems for use in motor vehicles are already known, especially navigation systems, in which the input of a sequence of letters and/or numbers by a keyboard and/or a touch screen monitor is possible. Driver information systems are also known, in which the input of a sequence of letters and/or numbers by means of speech is possible. In these devices generally input of letters and/or numbers by means of a key or keys is also possible. However if the user has chosen one of the two possible input methods, by keyboard or by speech device, for input of a particular sequence of letters and/or numbers, during input by that method the input must continue by the chosen method until the termination of the input of that particular sequence of letters and/or numbers.

SUMMARY OF THE INVENTION

It is an object of the present invention to provide an improved method of input that does not suffer from the above-described disadvantage.

These objects, and others, which will be made more apparent hereinafter, are attained in a method for input of a sequence of letters and/or numbers in a driver information system, in which the input of the sequence of letters and/or numbers occurs by keys or by a device for speech input. In this type of method the letters and/or numbers are input one after the other.

The method of input of a sequence of letters and/or numbers to a driver information system comprises the steps of:

a) activating the driver information system for input of the sequence of the letters and/or the numbers;

b) inquiring whether speech information is provided to the driver information system or whether a key of the driver information system has been pressed;

c) acquiring one of the letters of the sequence defined by the speech information or one of the numbers of the sequence defined by the speech information when speech information has been provided to the driver information system and acquiring one of the letters of the sequence defined by pressing the key or one of the numbers of the sequence defined by pressing the key when the key has been pressed;

d) ending the input of the sequence of the letters and/or the numbers by entry of a predetermined word or by pressing another key of the driver information system; and e) during the input of the sequence of the letters and/or numbers, switching at least once between entry of the sequence by means of pressing the key and the speech information.

The method according to the invention has the advantage that it is possible to switch or alternate between input by means of speech information and input by means of keys during the input of a single sequence of letters and/or numbers. Especially the driver information system checks whether input should be occurring by means of speech information or by means of keys for each letter and each number in the sequence of letters and/or numbers. Since a user thus can alternate between the two input methods during an input of the sequence, then in the event of sudden surrounding noise, which can interfere with the speech input method, the user can switch to input by means of a key or keys. Furthermore it is possible for a user who is waiting in his motor vehicle at a traffic light to switch from key input to speech input as soon as the traffic light allows the user to travel on. Because of this feature further key input is avoided during driving, which can have a negative effect on travel safety. Furthermore switching between input methods can occur arbitrarily often during input of the sequence, until the entire sequence of letters and/or numbers is input into the driver information system. If the user must stop, for example, after only a few meters, he can switch without difficulties from the speech input to the key input again.

The possibility then of switching between different input methods is of special advantage in driver information systems. Then a driver information system, for example, can include a navigation device for navigation of a motor vehicle in a street network, into which a starting location and a destination must be input in the navigation device by a user. Input of a location name may often require input of a large number of symbols. The same is true for a telephone integrated in the driver information system, in which e.g. the calling number or name of a party to be called is input by the user. In both applications the input process according to the invention allows the user to use the particular input method that is best for the user at each moment during the input of the sequence of letters and/or numbers, also e.g. of a place name or a telephone number.

Further advantages of the invention are provided by the features claimed in the appended dependent claims and described in the subsequent paragraphs.

It is especially advantageous when the input of a letter or a number by means of speech input is suppressed as soon as a key is pressed and that speech input occurs again when the input letter or number is again detected by the driver information system, e.g. when a keyboard memory is read or when the letter or number is stored in memory by an input device. This avoids conflicts due to input by both keys and speech that exchange symbols in the sequence.

It is also advantageous when activation of the input occurs by activation of a function of the driver information system, e.g. the telephone function or the navigation function. An additional activation by means of a spoken command or by depressing a key is then not necessary.

It is also advantageous when an input sequence of letters and/or numbers is automatically completed by the driver information system. When a user of the navigation function of the driver information system gives a place name as a destination and after input of a number of letters when a combination of input letters may correspond to a destination name stored in the driver information system, the driver information system suggests this destination name to the user. The user can now confirm or reject this destination by speech input or by keys and end its input.

Furthermore it is advantageous that input of special symbols, e.g. "+", besides the letters and/or numbers, for automatic completion of country selection, or control symbols can take place according to the method of the invention, so that the input of these symbols can also be controlled in the best manner for the benefit of the user.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

The method according to the invention is illustrated with the aid of the case of input of a telephone number into the driver information system equipped with a telephone. The telephone device is preferably a cellular telephone, by means of which a connection can be made to a mobile telephone network. The method of the invention is not limited to the telephone application. It can also be applied in the same way to input of a location name in a navigation system or the input of the name of a radio transmitter in a radio apparatus in order to select the radio transmitter. In these latter applications the telephone specific functions are then appropriately replaced by navigation-specific or radio-specific functions.

Figure 1:
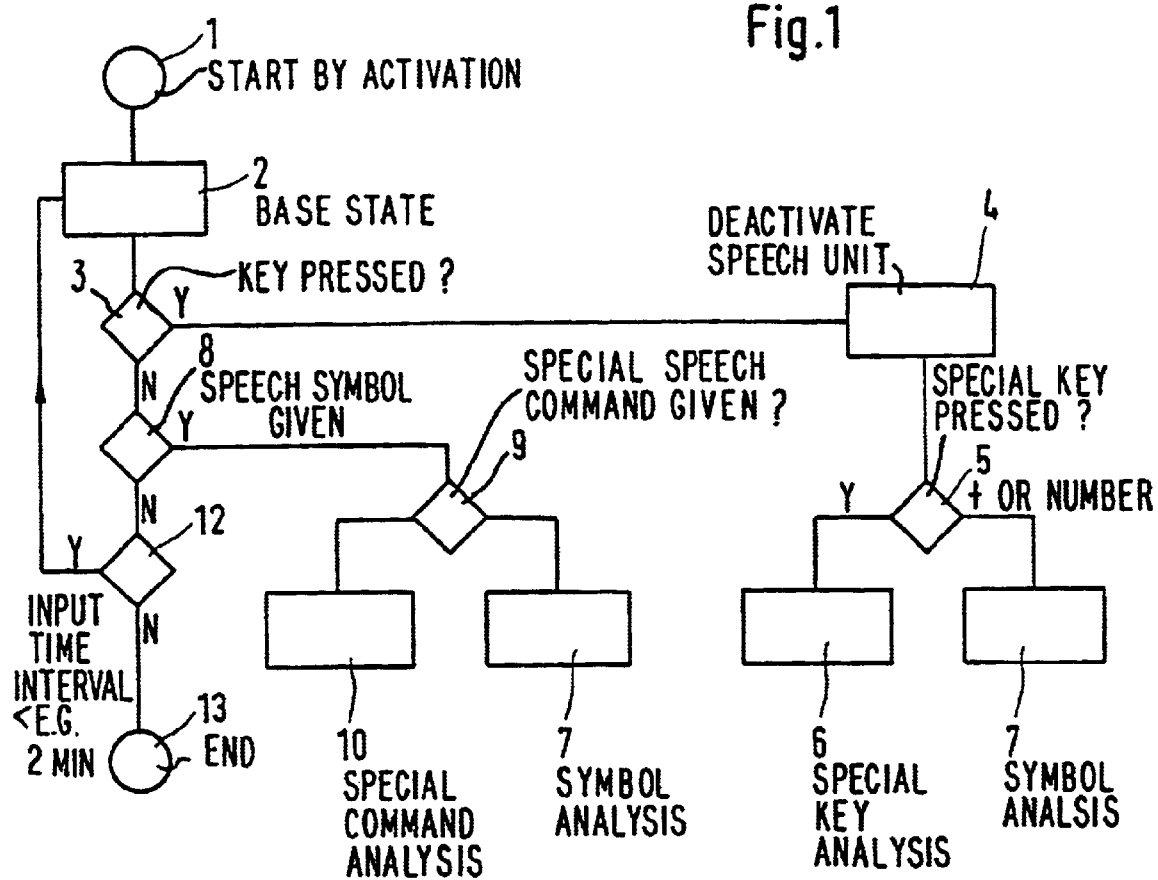
FIG. 1 is a flow chart showing a first part of the method according to the invention.

In FIG. 1 a first part of a method according to the invention for input of a telephone number into a driver information system with a telephone function is shown. The start of the input is initiated by an activation 1. The activation 1 can occur automatically with activation of the telephone function both by means of speech input and also be key activation. If the telephone function is already active, the activation 1 for activation of input can occur by means of a key and/or by means of speech input. After the activation an input device of the driver information system then is put in a base state 2 in which an inquiry or test of both a keyboard and a speech input unit occurs during a controlled time interval. In a first inquiry step 3 whether a key has been pressed since the last inquiry or test of the keyboard is tested or questioned. If a key has not been pressed, the method branches to a second inquiry step. If a key has been pressed, the speech input device is deactivated in method step 4, so that a clear or definite input by the user is possible, since the keyboard with the pressed key is given priority over the speech input device. In a first decision step 5 whether a special key, especially a command key, has been pressed is subsequently tested. In this case a special key analysis 6 is performed. If, in contrast to that, a number or a "+" key is pressed, the symbol analysis 7 continues. The symbol analysis 7 is illustrated in the flow chart in FIG. 2 and the special key analysis 6 is shown in the flow chart of FIG. 4. Here and in the subsequent description of the preferred embodiment the term "symbol" is used for a letter, a number or for a "+" sign.

Whether the speech input device, in the case that it is not deactivated, has detected a symbol since the last inquiry is tested in the second decision step 8. If this is not the case, the method branches to the third inquiry step 12. In the third inquiry step 12 how much time has elapsed during which no input by means of a key and/or by a speech input device is determined. If this interval is shorter than a predetermined time interval, e.g. 2 minutes, then the method branches back to the base state 2. If the time interval is larger or equal to the predetermined time interval, the method is ended in a terminal step 13. Since no input of a sequence of symbols has occurred, no such sequence is received in the driver information system at the terminal step 13.

If it is determined in the second inquiry step 8 that a speech input has occurred the method branches to the second decision step 9. In the second decision step 9 whether a special command has been given is tested. If the special command has been given, the method branches further to a special command analysis 10. If in contrast a symbol has been given, thus the method branches further to the symbol analysis 7. The special command analysis 10 is shown in the flow chart of FIG. 5.

Figure 2:
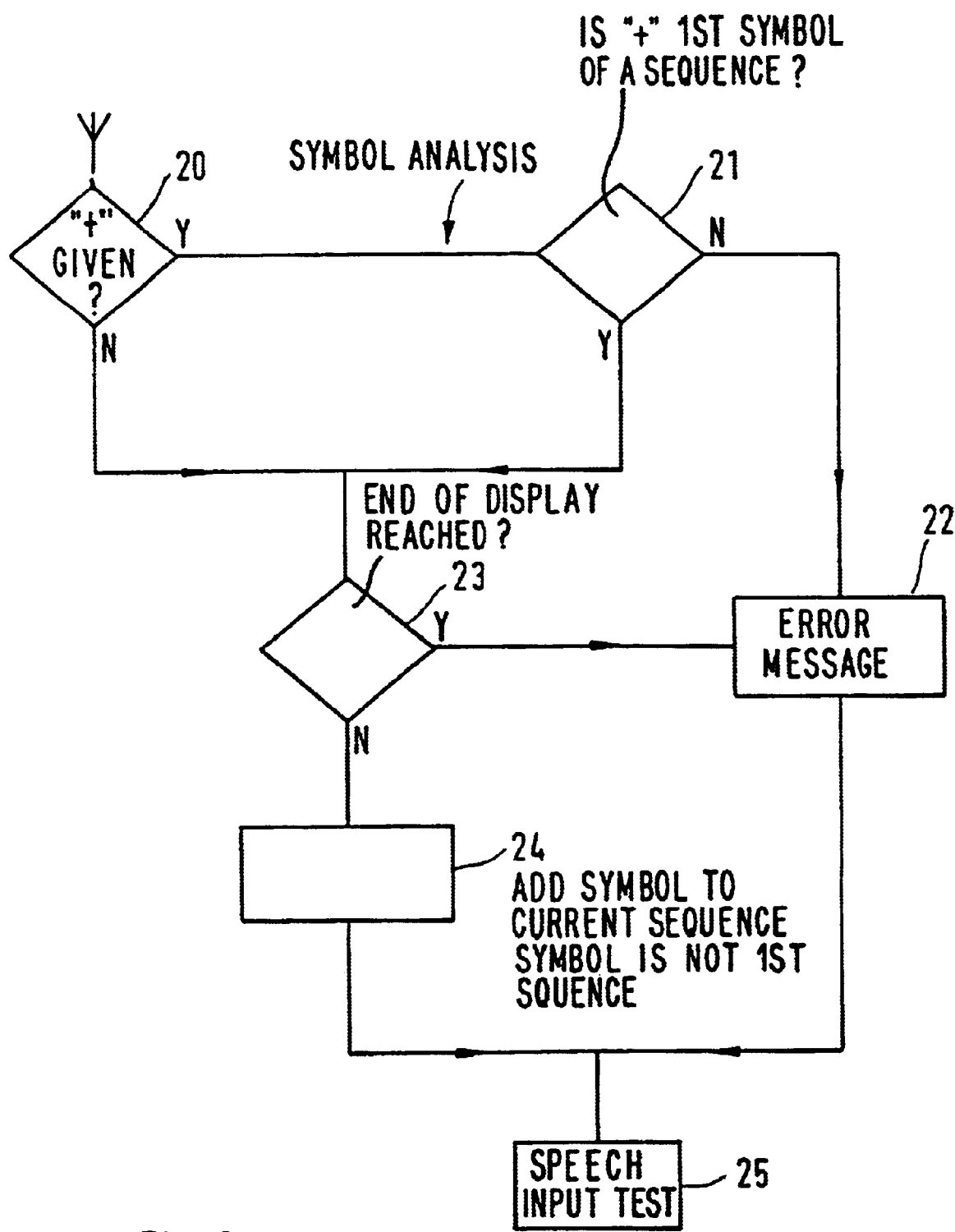
FIGS. 2, 3, 4 and 5 are flow charts showing other portions of the method according to the invention.

In FIG. 2 the symbol analysis 7 is illustrated. This analysis is either reached from the first decision step 5 or the second decision step 9 and starts with a first test step 20, in which whether the symbol given is a sign "+" or not is tested. If the "+" symbol is detected, the method branches to the second test step 21. In the second test step 21 the system branches to another test step 23, if the "+" symbol is the first symbol of a sequence. The "+" symbol is interpreted as a space holder e.g. for the first part of a country pre-selector for the later choice by the telephone device. The method also branches from the first test step 20 to the third test step 23 when the symbol detected by the speech device is not the "+" symbol. If the "+" symbol is not the first symbol of the sequence of symbols, the method branches to issue an error message 22. In a third test step 23, whether the end of the display has been reached, whether, for example, the display is completely filled with symbols is tested. If this latter situation is the case, the method branches to the error message 22. If this is not the case, the method branches to a processing step 24. In the processing step 24 the new determined symbol acting as the first symbol of a new sequence of letters or symbols is determined, in case the input symbol is the first symbol of a new sequence of letters and/or symbols. If it is not the first symbol, it is added to the current sequence of letters or symbols at its end. The method branches further from the processing step 24 in the same manner as from the error message 22 to a speech input test 25.

Figure 3:
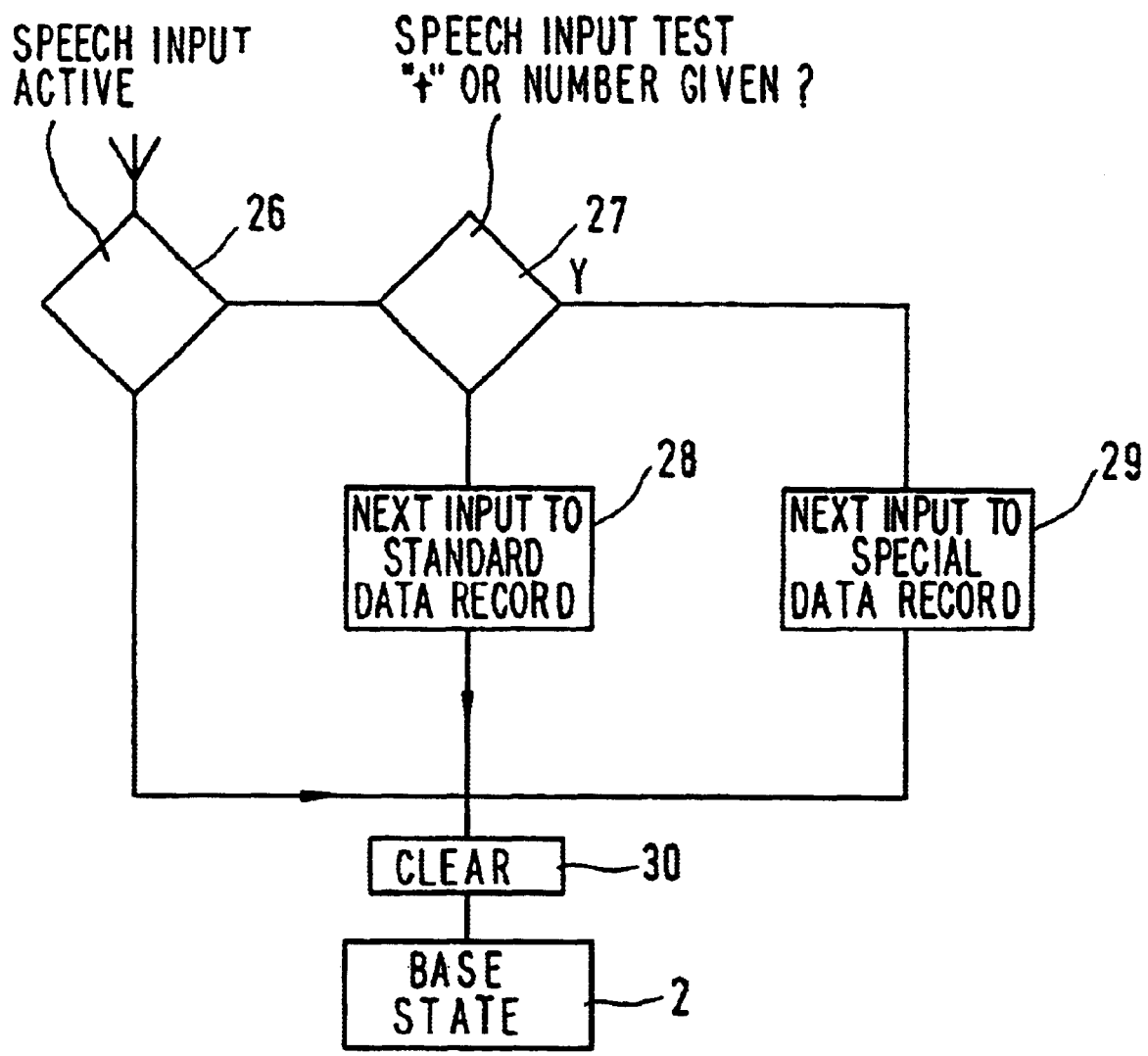

The speech input test 25 is shown in FIG. 3. It begins with a first test step 26 in which whether the speech input is active is tested. If the speech input is not activated, the method branches further to an activation step 30. In the activation step 30 the speech input is again cleared and the memory of the speech input unit is initialized, in case the user did not switch it off by means of a deactivation command. After that the input unit is again put in the base state 2 and the method according to FIG. 1 continues for input of the next symbol or command, as illustrated in the description for FIG. 1. The activation step 30 guarantees that an input by speech input is again possible during the next symbol, in case the user did not switch it off by a deactivation command.

If the method establishes in the first test step 26 that the speech input was activated, whether the "+" symbol or a number is given is tested in the second test step 27. If that is not the case, a standard data record is used for the next speech input in a process step 28. After the process step 28, similarly the method branches to the activation step 30.

If it is established that the last given symbol was the "+" symbol or a number during the second test step 27, a special data record is established for the speech input in the process step 29, so that whether the spoken symbol is a number may be tested in the next speech detection. Because of this feature the speech detection, especially with telephone numbers, in which there are a series of numbers following each other, is simplified. Other symbols and/or commands can be similar acquired with this special data record. The recognition of the symbol can however take somewhat more time. The method similar branches from the process step 29 to the activation step 30.

Figure 4:
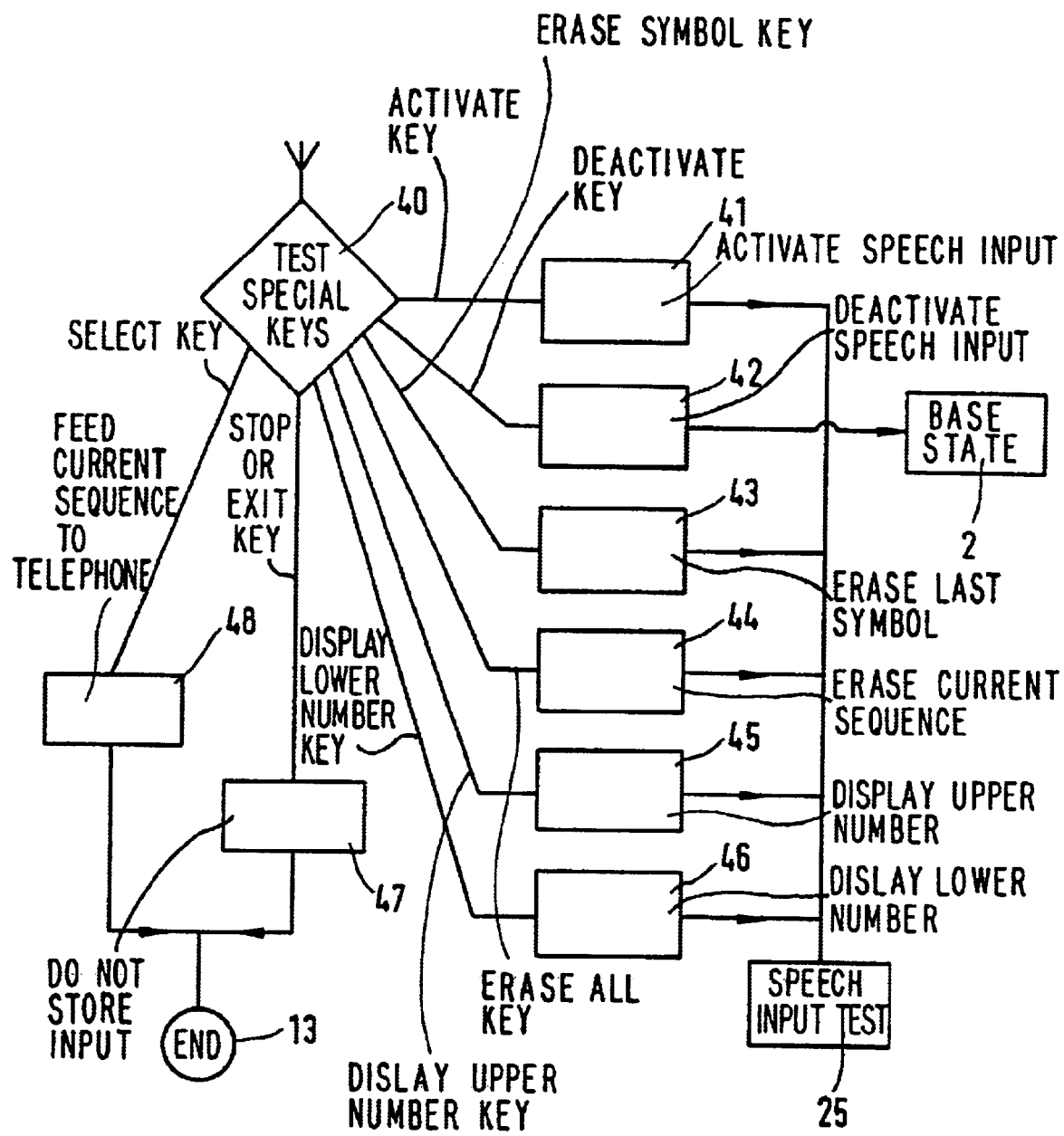

In FIG. 4 the special key analysis 6 is illustrated. It begins with a decision step of special key 40, in which the identity of the given special key is tested. If a special key "activate speech input" is pressed, the method branches to a process step "activate speech input" 41. In this process step it is established that at least the next symbol should be input by means of speech input. Subsequently the method branches further to the speech input test 25. If the key "deactivate speech input" is pressed, the method branches from the decision step for the special key 40 to a process step "deactivate speech input" 42. In this process step the speech input is deactivated. This can be advantageous, among other things, when loud surrounding noise or speech in the vehicle is occurring, which can possibly interfere with the speech input. An activation is possible by means of the key "activate speech input" or on input of a new sequence of symbols. After the process step 42 the method branches to the base state 2. If the key "symbol erase" is pressed, the method branches further from the decision step 40 to a process step "erase symbol" 43. In the process step 43 the last input symbol is erased. After that the method branches to the speech input test 25. If the key "erase all" is pressed, the method branches further from the decision step 40 to a process step "erase all" 44. The current sequence of letters and/or numbers is erased in the process step 44. After that the method branches further to the speech input test 25. If the key "display upper number" is pressed, the method branches to a process step "display upper number" 45. In this process step a number, which is selected from a list that is given to a display of the driver information system, which is above the actual displayed numbers. The list can be a list of the last call numbers selected by the user or a list of the call numbers stored by the user. After that step the method branches likewise to speech input test 25. If the key "display lower number" is pressed, the method branches to a process step "output lower number" 46. In this process step a number is selected which is arranged in the list below the actually displayed numbers. After that the method branches further to the speech input test 25. If the key "stop or exit" is pressed, the method branches to a process step "exit" 47. After this process step the method further branches to the terminal step 13 without storing the input data in the driver information system. If in contrast the key "select" is pressed, the method branches from the decision step 40 to the process step "select" 48. From the process step "select" the method likewise branches to the terminal step 13, but a selected input telephone number is transferred from the input device to the telephone unit.

Figure 5:
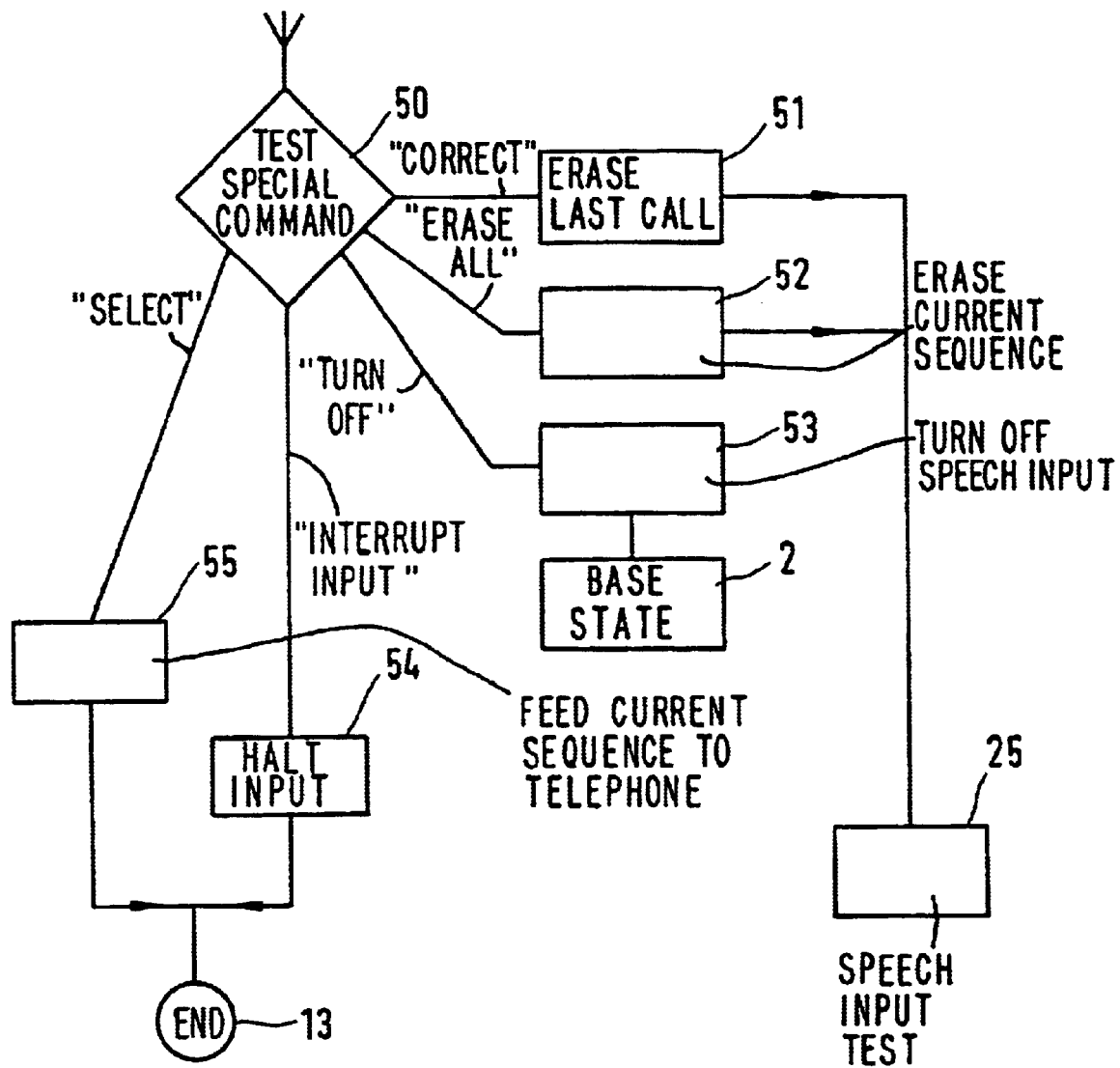

In FIG. 5 the special command analysis 10 is illustrated. The special common analysis 10 begins with a decision step for the special command 50. If the speech input of the command "correction" is detected, the method branches to a process step 51. In the process step 51 the last input symbol is erased. Subsequently the method branches to the speech input test 25. When the command "erase all" is detected by the speech input device, the method branches to a process step 52, in which the currently input sequence is erased. Subsequently the method branches further to the speech input test 25. If the command "turn off speech input" is given, the method branches further to a process step "turn off speech input" 53, in which the speech input is deactivated, until activation by pressing a key for activation or until input of a new sequence of symbols. Subsequently the method branch further to a base state 2. If the command "interrupt input" is given, the method branches to a process step 54, in which the input is halted and the method branches to the terminal step 13 without storing the currently input letters and/or symbols. If the function "select" is chosen, the method branches to the process step 55, in which the currently input sequence of letters and/or symbols is transmitted from the input device to the telephone apparatus so that the given number may be selected. Similarly the method then branches to the terminal step 13.

Figure 6:
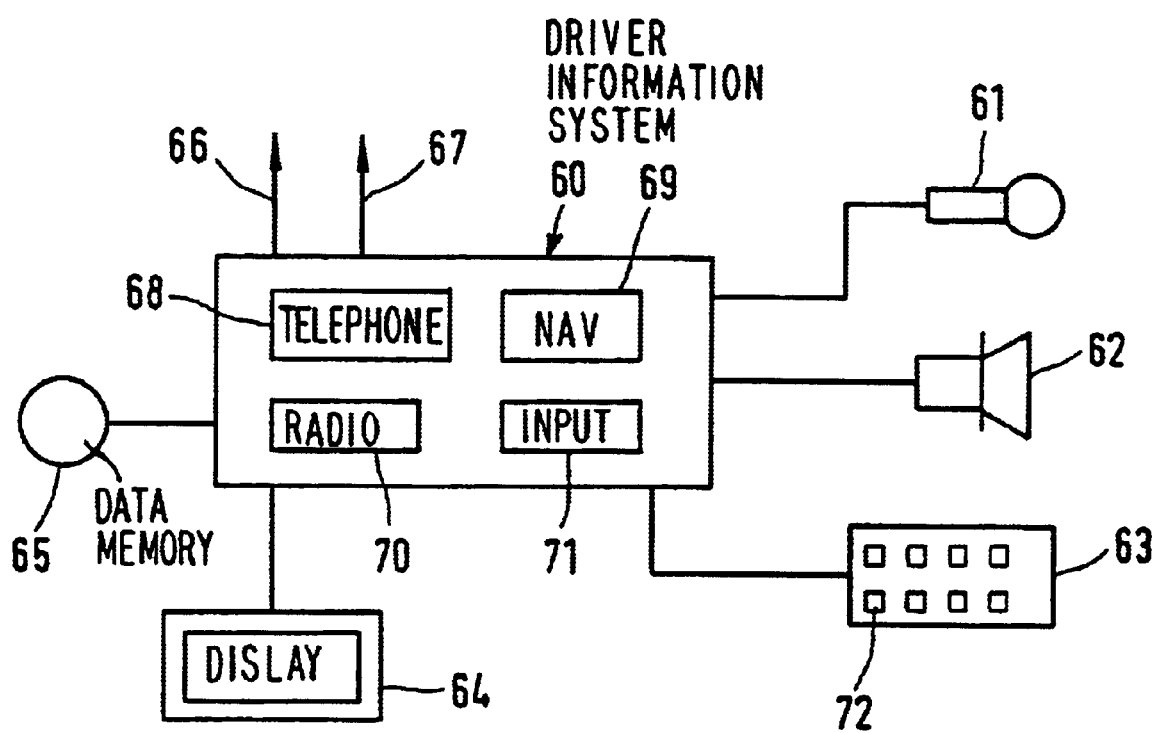
FIG. 6 is a block diagram of a driver information system according to the invention.

In FIG. 6 a driver information system 60 is illustrated, in which the method according to the invention can be implemented. The driver Information system 60 has a microphone 61 and a loud speaker 62. Furthermore it also has a keyboard 63 with keys 72. The driver information system 60 has available a first antenna 66 for reception of GPS signals, which serves to determine location of the vehicle, and a second antenna 67 for reception of radio waves, for example radio signals and/or GSM signals. Furthermore the driver information system has a data memory 65, e.g. an optical data carrier, and a display unit 64. The driver information system also has available a telephone device 68, a navigation device 69, a radio device 70 and an input device 71. Unshown components required for speech input, e.g. a processor and a memory, are arranged in the input unit. According to the invention the input can now occur either by means of the microphone 61 and/or the keys of the keyboard 63 during the input of a sequence of symbols. The method according to the invention is thus performed in the input device 71, which conducts the determined sequence of letters and/or symbols into the telephone device 68, the navigation device 69 and/or the radio device 70. The method for input of Information to the navigation device differs from that described in connection with FIGS. 1 to 5, in that the command statements are changed to command statements that are important for the navigation device. These commands are, e.g., "selected starting location", "select destination location", "fastest route" or "most direct route". For input to the radio the command statements specific for the telephone are replaced by appropriate command statements for the radio, e.g. "select radio station", "selected traffic broadcast", "hear classical music" or "turn off radio". The named commands are not necessarily given literally, but can be given by suitable abbreviations or other audible commands with suitable significance according to the particular embodiment.

An acknowledging message regarding the input command or the input sequence of letters and/or numbers can be provided on the display 64 and/or over the loud speaker 62, so that the user obtains an acknowledgement indicating that the driver information system received the correct information.

An input can now occur e.g. as described in the following example according to the method of the invention. The telephone function of the driver information system is activated by means of a key. Numbers 0,5,1,2,1 are input one after the other by means of speech. Now the driver presses the keys 4,9,1,2. Subsequently it gives the numbers 3,2 by speech input. Subsequently he press the keys. The input device 71 transmits the input calling number "05121491232" and the command "select". The telephone device 68 makes the connection. Furthermore it is possible that the input is activated by means of the speech command "input calling number". Subsequently the user likewise gives the to numbers 0,5,1,2,1, by means of speech input, subsequently by pressing the keys 4,9,1,2,3,2 and subsequently supplies the calling number "05121491232" to the telephone device 68 by means of the commands for speech input.

The disclosure in German Patent Application 199 14 631.4-31 of Mar. 31, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an input method for a driver information system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of input of a sequence of letters and/or numbers to a driver information system comprises the steps of:

a) activating the input of the sequence of the letters and/or the numbers;

b) inquiring whether speech information is provided for the driver information system or whether a key of the driver information system has been pressed;

c) acquiring one of the letters of the sequence defined by the speech information or one of the numbers of the sequence defined by the speech information when the speech information has been provided to the driver information system and acquiring one of the letters of the sequence defined by pressing the key or one of the numbers of the sequence defined by pressing the key when the key has been pressed;

d) ending the input of the sequence of the letters and/or the numbers by entry of a predetermined word or by pressing another key of the driver information system; and e) during the input of the sequence of letters and/or numbers, switching at least once between entry of said sequence by means of pressing said key and said speech information.

2. The method as defined in claim 1, further comprising giving priority to the entry of said sequence of the letters and/or the numbers by means of said key instead of said speech information when another key is pressed.

3. The method as defined in claim 1, further comprising suppressing the input of said sequence of the letters and/or the numbers by means of said speech information when another key is pressed and activating the input of the speech information again after said one of said letters or said one of said numbers input by pressing said key is acquired by the driver information system.

4. The method as defined in claim 1, further comprising using said sequence of said letters and/or said numbers for selected of a vehicle destination or for selection of a telephone number or for selection of a radio station.

5. The method as defined in claim 1, wherein the activating of the sequence of the letters and/or the numbers occurs by activating a function of the driver information system and wherein said function includes a telephone function or a navigation function.

6. The method as defined in claim 1, further comprising comparing a currently input sequence of the letters and/or numbers with a stored sequence of the letters and/or the numbers already present in the driver information system and automatically completing said currently input sequence of the letters and/or numbers only when a combination of the currently input sequence of letters and numbers corresponds to a part of the stored sequence of the letters and/or the numbers.

7. The method as defined in claim 1, further comprising outputting a warning message when unclear or erroneous input is detected.

8. The method as defined in claim 7, wherein said warning message is output by a speech output device of the driver information system.

9. The method as defined in claim 1, wherein said driver information system has a special key and a special control command for the input is activated by pressing said special key.

10. The method as defined in claim 9, wherein said special control command is for correction or termination of the input.

* * * * *